(12) United States Patent
Miyazoe

(10) Patent No.: US 6,227,248 B1
(45) Date of Patent: May 8, 2001

(54) MANIFOLD-TYPE FLOW DETECTOR ASSEMBLY

(75) Inventor: Shinji Miyazoe, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/195,684

(22) Filed: Nov. 19, 1998

(30) Foreign Application Priority Data

Dec. 11, 1997 (JP) .................................................. 9-362031

(51) Int. Cl.⁷ .............................. F16K 21/00; F16K 1/52
(52) U.S. Cl. ............................................. 137/883; 137/884
(58) Field of Search ..................................... 137/883, 884

(56) References Cited

U.S. PATENT DOCUMENTS

| 3,785,389 | 1/1974 | Friedland et al. |
| 4,399,836 | 8/1983 | De Versterre et al. |
| 5,819,782 | * 10/1998 | Itafuji ................................. 137/884 |
| 6,076,551 | * 6/2000 | Miyazoe ............................... 137/884 |

FOREIGN PATENT DOCUMENTS

WO 95/07427    3/1995 (WO).

* cited by examiner

Primary Examiner—Michael Buiz
Assistant Examiner—Ramesh Krishnamurthy
(74) Attorney, Agent, or Firm—Oblon, Spivak, McClelland, Maier & Neustadt, P.C.

(57) ABSTRACT

The present invention provides a flow detector assembly that enables an integrated apparatus to execute flow measurement and regulation and that further enables multiple such apparatuses to be arranged and installed using manifold blocks. This assembly comprises a plurality of flow detectors and a plurality of manifold blocks. In the flow detector, the detection section of a flow sensor is disposed in a flow channel penetrating the interior of the detector body. The fluid channel is opened at the respective ends of the detector into input and output openings which in turn open into mounting surfaces. A flow control valve is disposed in the channel. The manifold block has an input and an output passages corresponding to the input and output openings. The input passage is allowed to communicate with a common input port through an input common passage. The output passage is individually opened into an output port.

5 Claims, 2 Drawing Sheets

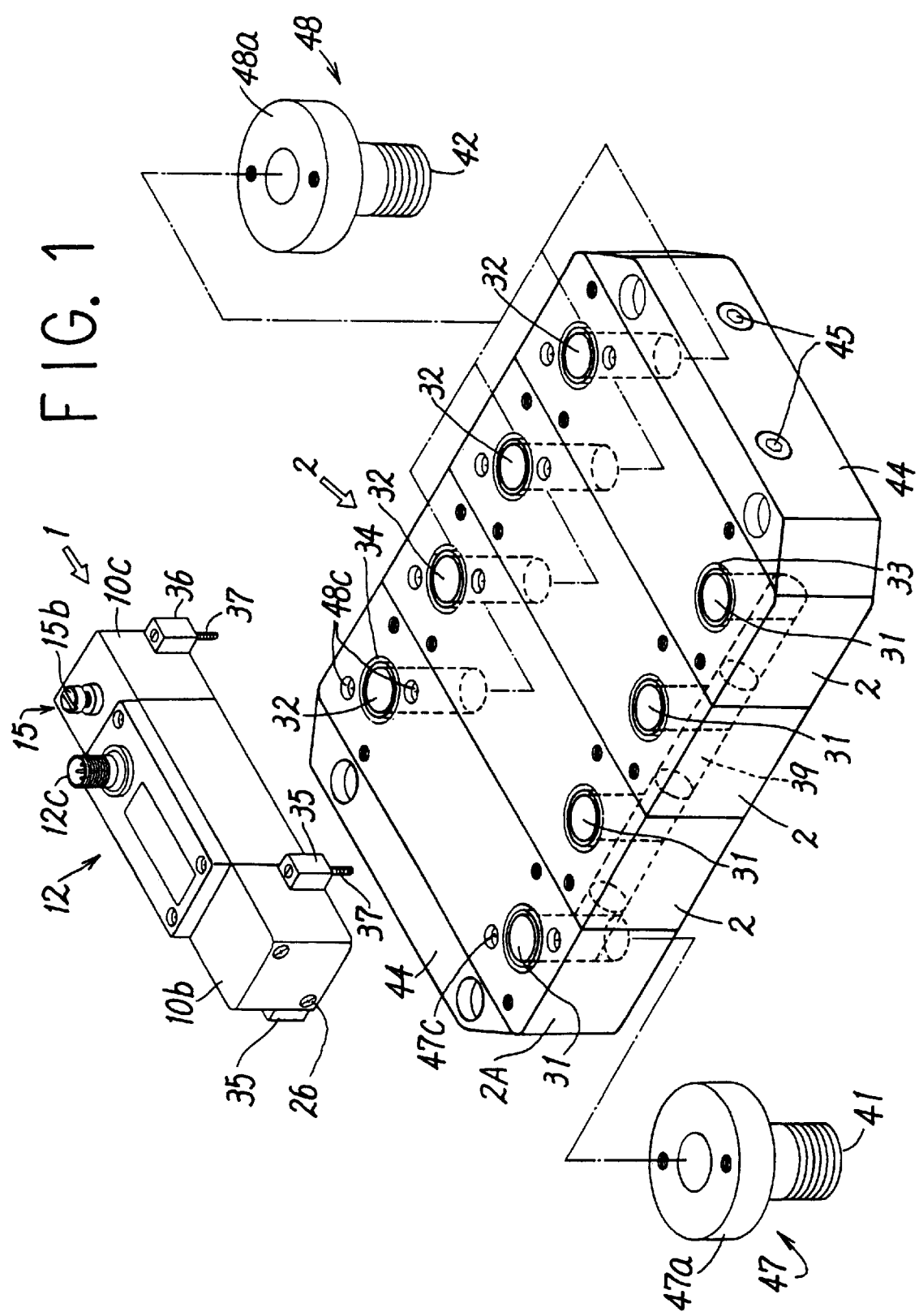

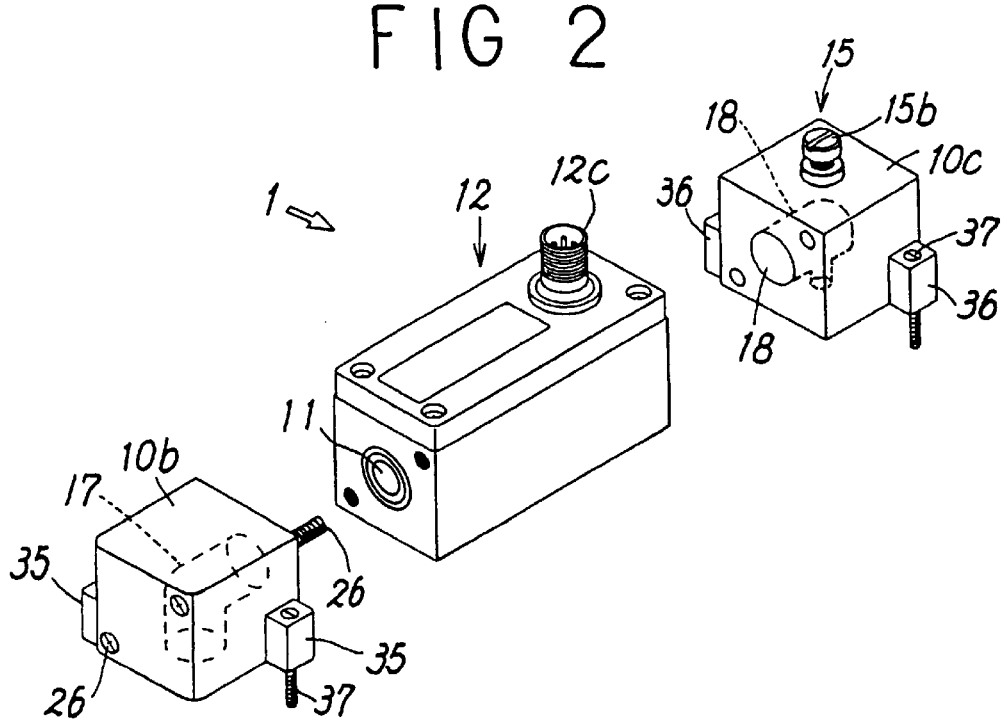
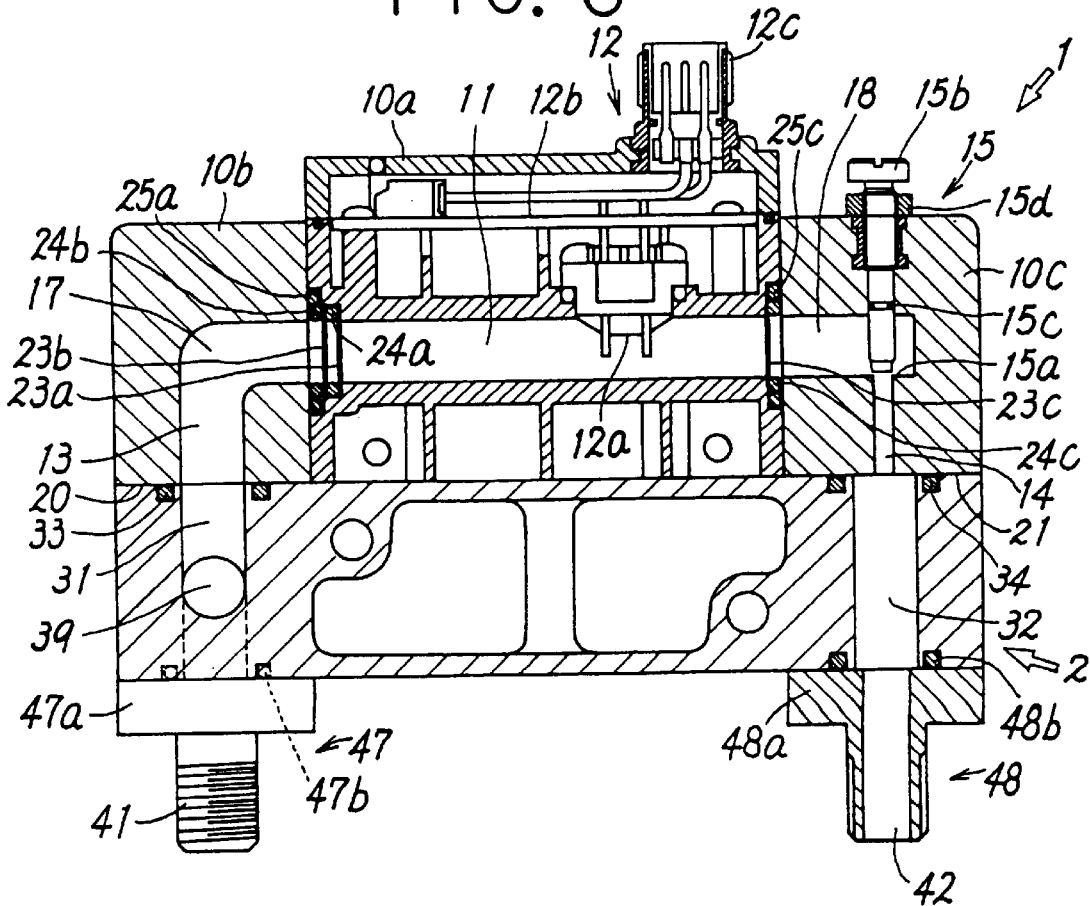

MANIFOLD-TYPE FLOW DETECTOR ASSEMBLY

FIELD OF THE INVENTION

The present invention relates to a manifold-type flow detector assembly that can be effectively used for semiconductor fabrication apparatuses and other such equipment maintained in clean environments.

PRIOR ART

A flow sensor for detecting the flow of a fluid flowing through a channel is generally incorporated into various forms of fluid equipment or used as an independent apparatus. If the flow sensor is used independently in a general-purpose application, pipes are normally connected to the input and output sides of the sensor, and a flow control valve is further connected in series to the sensor. When a flow control valve is connected to enable a given fluid whose flow has previously been measured and regulated to be supplied, the piping between the flow sensor and flow control valve becomes much more complicated.

In addition, in a semiconductor fabrication facility, which is extremely susceptible to contamination by foreign matter, a connection means must be able to prevent fine foreign matter from being generated when pipes (or flow sensors or flow control valves) are either connected or replaced. Threaded pipes are unsuitable, for example, because fine powder is likely to be generated on the threads as pipes are screwed together or loosened.

DISCLOSURE OF THE INVENTION

It is a technical object of this invention to solve the above-noted problems in order to provide a manifold-type flow detector assembly that allows a flow control valve to be assembled using a flow detector, including a flow sensor, to enable the single detector to measure and regulate a flow, and that allows the flow detector to be mounted via a manifold block, thereby enabling a plurality of flow detectors with a flow control valve to be simply mounted in various equipment without requiring a large amount of space.

It is another technical object to provide a manifold-type flow detector assembly that uses manifold blocks to enable an easy piping configuration to be achieved, despite the presence of a large number of flow sensors and flow control valves, in order to reduce working time while enabling the flow sensor and flow control valve to be easily installed and removed.

It is yet another technical object of this invention to provide a manifold-type flow detector assembly that can prevent the fine powder resulting from the installation or removal of screws from remaining in channels during assembly of the flow detector (including a flow control valve) or a manifold block, or replacement of such parts.

To achieve these objects, this invention provides a manifold-type flow detector assembly comprising a plurality of flow detectors with a flow control valve having the detection section of a flow sensor disposed in a flow channel penetrating the interior of the detector body, the ends of the fluid channel being in communication with an input and an output openings opened in mounting surfaces parallel to the axis of the fluid channel, a flow control valve being disposed in the channel; and a plurality of manifold blocks each having an input and an output passages corresponding to the input and output openings, the input passage being in communication with an input common passage, the output passage being individually in communication with an output port, wherein each of the manifold blocks is coupled to each of the flow detectors with the input and output opening in the flow detector joined with the input and output passages in the manifold block, respectively, and wherein the manifold blocks are connected and fixed together with the input common passages provided therein allowed to communicate mutually, the input common passage being allowed to communicate with a common input port.

According to the flow detector assembly of this invention, the flow detector is composed of a detector body including a flow sensor; and an input and an output blocks mounted on the input and output sides of the fluid channel in the detector body and having mounting surfaces into which the input and output openings are opened that are in communication with the fluid channel. Desirably, the detector body and each of the channels provided in the input and output blocks are joined together via seal members, and the detector body and each of the input and output blocks are fixedly connected at peripheral positions separate from the channels using connection means. Also, the flow control valve is provided in the input and/or output blocks.

In addition, according to the flow detector assembly of this invention, the input and output openings in the flow detector are desirably joined together via seal members with the input and output passages in the manifold block, and the manifold block and flow detector are desirably connected together at positions separate from the input and output passages and input and output openings using a connection means. Furthermore, this assembly desirably has a flange section for attaching a joint member having a common input port in communication with the input common passage in the manifold block and a joint member having an output port in communication with the output passage in the manifold block, to the periphery of the openings of the input common passage and output passage via seal members. The flange section can desirably be connected fixedly to the manifold block using a connection member.

According to the manifold-type flow detector assembly of this invention configured as described above, the input port in the manifold block is connected to a fluid supply source, and each output port in the manifold block is allowed to communicate with a plurality of loads that each receive a supply of fluid. The flow of fluid supplied from the input port through the input common passage is detected by the detection section of the flow sensor in each flow detector, and is regulated by the flow control valve. The fluid is then output to the loads through the output ports. Thus, each flow detector can set an arbitrary flow depending on the load.

In the flow detector assembly, the input and output blocks are mounted on the input and output sides of the flow detector body having the detection section of the flow sensor disposed in the fluid channel penetrating the interior of the body, so that the blocks and the flow detector body are integrated together. The flow control valve is provided in the input and/or output blocks. This configuration provides a compact flow detector with a flow control valve and enables a single flow detector to execute both flow measurement and regulation.

In addition, in the flow detector assembly, the mounting surface into which the input and output openings in the input and output blocks are opened is joined with the manifold block to fix them together, the plurality of manifold blocks are connected and fixed together by allowing the input common passages provided therein to communicate mutually, and the input common passages are allowed to communicate with the common input ports. This configuration offers several benefits. It enables a large number of flow detectors equipped with flow control valves to be mounted easily, without requiring a large space; it allows the detectors to be removed and installed easily for replacement; and it employs a common input port to reduce the number of pipe joints required, thereby simplifying the piping operation and reducing piping configuration time.

Furthermore, by joining the channels in the flow detector body and each of the input and output blocks together via seal members, and joining the input and output openings in the flow detector equipped with a flow control valve, with the input and output passages in the manifold block via seal members, and the flow detector body and each of the input and output blocks are connected together at positions separate from the channels. This configuration prevents any fine powder resulting from the installation or removal of screws from remaining in the channels during assembly of the flow detector (including the flow control valve) or the manifold block or replacement of these parts.

In addition, since the joint members having input and an output ports have flange sections that are attached to the periphery of the openings of the input common passage and output passage in the manifold block via seal members, joint members of various shapes and structures can be used to deal with structural considerations relating to the mounting section of any machine or facility on which this manifold-type flow detector assembly is mounted, thereby increasing the assembly's range of applicability.

BRIEF DESCRIPTION OF THE DRAWINGS

FIG. 1 is an exploded perspective view showing an embodiment of a manifold-type flow detector assembly according to this invention.

FIG. 2 is an exploded perspective view of a flow detector with a flow control valve according to the above embodiment.

FIG. 3 is a sectional view of the above embodiment.

DESCRIPTION OF THE PREFERRED EMBODIMENTS

FIGS. 1 to 3 show one embodiment of a manifold-type flow detector assembly according to this invention. This flow detector assembly is mainly composed of a plurality of flow detectors with a flow control valve 1 and a plurality of manifold blocks 2 on which the flow detectors are mounted.

The flow detector 1 has a detection section 12a disposed in a fluid channel 11 penetrating the inside thereof, the fluid channel 11 is opened at the respective ends of the detector into an input and an output openings 13 and 14, and a flow control valve 15 is disposed in the fluid channel. The illustrated flow sensor 12 is of a type in which the detection section 12a detects the heat of a fluid flowing through the fluid channel 11, but a vortex type fluid sensor may be used.

In the illustrated embodiment, the flow detector 1 is composed of a flow detector body 10a comprising the fluid channel 11 penetrating the inside of the body and the flow sensor 12; an input block 10b mounted on the input side of the fluid channel 11 in the flow detector body 10a; and an output block 10c mounted on the output side of the fluid channel 11. The input and output blocks 10b and 10c have an input and an output channels 17 and 18, respectively, in communication with the fluid channel 11, and the input and output openings 13 and 14 are opened at the ends of the channels 17 and 18. The input and output openings 13 and 14 are opened at the centers of mounting surfaces 20 and 21 formed on the input and output blocks 10b and 10c in such a way as to be parallel to the axis of the fluid channel 11. The flow control valve 15 is disposed in the output channel 18 in the output block 10c.

The flow sensor 12 comprises the detection section 12a disposed in the fluid channel 11 and is wired and connected via a printed circuit board 12b to an electric connector 12c which is in turn connected to a flow measuring apparatus.

In addition, although the flow control valve 15 for regulating the flow of fluid is shown as a restrictor, including a needle 15b the tip of which is opposed to a valve seat 15a of the output channel 18, which is screwed and inserted into the output block 10c via a seal member 15c, and which can be fixed using a lock nut 15d, another structure may be used instead. And although the figure shows that the flow control valve 15 is provided in the output block 10c, it may be provided in the input block 10b or in both input and output blocks 10b and 10c.

In the connection between the flow detector body 10a and the input block 10b, filters 23a and 23b are locked at the input-side end of the fluid channel 11 in the flow detector body 10a using presser rings 24a and 24b, and a seal member 25a is disposed around the filters. In addition, in the connection between the flow detector body 10a and the output block 10c, a filter 23c is locked at the output-side end of the fluid channel 11 using a presser ring 24c, and a seal member 25c is disposed around the filter. Consequently, the fluid channel 11 in the flow detector body 10a and the input and output channels 17 and 18 in the input and output blocks 10b and 10c are joined together via the seal members 25a and 25c. The flow detector body 10a and each of the input and output blocks 10b and 10c are connected together at peripheral positions of the input and output blocks 10b and 10c separate from the channels, using screws 26. The connection means for connecting the flow detector body 10a and each of the input and output blocks 10b and 10c is not limited to the screw 26; instead, an arbitrary means can be used to connect them together at positions separate from the fluid channel 11.

To smooth the flow of fluid flowing through the fluid channel 11 in the flow detector body 10a, in order to improve the accuracy of flow detection, the fluid channel 11 has an almost uniform and linear cross section. In addition, the channel formed at the junction of each of the input and output blocks 10b and 10c with the flow detector body 10a has an almost uniform and linear cross section relative to the fluid channel 11. The input and output channels 17 and 18 in the input and output blocks 10a and 10b must be bent perpendicularly in the input and output blocks 10b and 10c so as to be mounted on the manifold block 2 at the mounting surfaces 20 and 21, which keep the flow detector 1 parallel to the axis of the fluid channel 11. Thus, in the input block 10b in which the flow control valve 15 is smoothed, the internal input channel 17 is smoothly bent to open the end of the internal input channel 17 in the mounting surface 20, while in the output block 10c in which the flow control valve 15 is mounted, the output side of the flow control valve 15 is opened in the mounting surface 21 without any need to complicate the internal channels.

The manifold blocks 2 and 2A, on which the flow detector 1 is mounted at the mounting surfaces 20 and 21, have input and output passages 31 and 32 corresponding to the input and output openings 13 and 14 which in turn open into the mounting surfaces 20 and 21. Then, the input and output openings 13 and 14 in the flow detector 1 can be joined with the input and output passages 31 and 32 via seal members 33 and 34 to connect the flow detector and each of the input and output blocks together at the input and output passages 31 and 32 in the input and output blocks 10b and 10c and at mounting seats 35 and 36 at positions separate from the input and output openings 13 and 14, using screws 37. This connection enables the mounting and piping of the flow detector 1 to be simultaneously completed.

The connection means for connecting the flow detector 1 and the manifold blocks 2 and 2A together is not limited to the screw 37; an arbitrary means for fixedly connecting them together can be used as well.

In the manifold blocks 2 and 2A, the input passage 31 is in communication with the input common passage 39, and the output passage 32 is individually opened into an output port 42. A plurality of manifold blocks 2 and 2A are connected and fixed together using connection bolts 45 that penetrate end plates 44, as shown in FIG. 1. In this case, the manifold blocks are connected and fixed together in such a way that the input common passages 39 are mutually in communication, and the input common passages 39 are allowed to communicate with common input ports 41 provided in some of the manifold blocks 2A. The input port 41 is used for communication with a common fluid source, and the output port 42 is used to output a fluid, the flow of which has been individually detected and measured by the flow detector 1 mounted on the manifold block.

A joint member 47 having the input port 41 and a joint member 48 having the output port 42 have flange sections 47a and 48a, respectively, that are attached via seal members 47b and 48b to the periphery of the openings of the input common passages 39 in some of the manifold blocks 2A and the openings of the output passages 32 in the manifold blocks 2 and 2A. The joint members are fixed and connected using screws 47c and 48c that are screwed into the flange sections 47a and 48a from above the manifold block 2, or by some other connection means. Only one manifold block 2A including the joint member 47 must be included in a large number of manifold blocks connected together, but a plurality of manifold blocks 2A may be provided.

In the manifold-type flow detector assembly of the above configuration, the input port 41 in the manifold block 2A is connected to a fluid supply source, and the output port 42 in each manifold block is allowed to communicate with a plurality of loads to which a fluid is individually supplied. The flow of fluid supplied from the input port 41 through the input common passage 39 is detected by the detection section 12a of the flow sensor 12 in each flow detector 1, and the flow control valve 15 provided in the output block 10c regulates the flow to allow the fluid to be output from each output port 42 to the load. Thus, each flow detector 1 can set an arbitrary flow depending on each load.

Thus, in this flow detector assembly, the input and output blocks 10b and 10c are mounted on and integrated with the input and output sides of the flow detector body 10a with the detection section 12a of the flow sensor 12 disposed in the fluid channel 11, and the flow control valve 15 is provided in the output block 10c. Consequently, the flow detector 1 can be configured to be small, and this integrated flow detector 1 can executed both flow measurement and regulation.

In addition, in this flow detector assembly, the mounting surfaces 20 and 21 into which the input and output openings 13 and 14 in the input and output blocks 10b and 10c are opened are joined with and fixed to the manifold block 2.

Furthermore, a plurality of manifold blocks 2 are connected and fixed together by allowing the input common passages 39 provided therein to communicate mutually, and the input common passages 39 are then allowed to communicate with the common input port 41. This configuration enables a large number of flow detectors 1 to be mounted easily without requiring a large space, and to be installed and removed easily for replacement, and also uses the common input port 41 to reduce the number of pipe joints required, thereby simplifying the piping operation while reducing piping configuration time.

Furthermore, by joining together the channels 11, 17, and 18 provided in the flow detector body 10a and the input and output blocks 10b and 10c via the seal members 25a and 25c, and joining the input and output openings 13 and 14 in the flow detector 1 with the input and output passages 31 and 32 in each manifold block 2 via the seal members 33 and 34, the flow detector body and each of the input and output blocks are connected together at positions separate from the channels using the screws 26 and 37. This configuration prevents any fine powder resulting from the installation or removal of screws from remaining in the channels during assembly of the flow detector 1 or manifold block 2 or during replacement of these parts.

In addition, the flange sections 47a and 48a are provided in the joint members 47 and 48 having the input and output ports 41 and 42, respectively, and are attached to the periphery of the openings of the input common passage 39 and output passage 32 in the manifold blocks 2 and 2A via the seal members 47b and 48b. As a result, joint members of various shapes and structures can be used to deal with structural considerations relating to the mounting section of any machine or facility onto which this manifold-type flow detector assembly is mounted, thereby increasing this assembly's range of application.

The flow detector assembly according to this invention, as described in detail above, can provide a flow detector assembly that functions as a flow sensor effectively suited for widespread use in clean environments such as a semiconductor fabrication apparatus, wherein a flow control valve can be assembled with the detector beforehand to allow the integrated apparatus to execute flow measurement and regulation, and wherein such detectors can be arranged and installed using manifold blocks, thereby enabling a plurality of flow detectors to be mounted simply on various equipment without any need for a large space.

What is claimed is:

1. A manifold-type flow detector assembly comprising a detector body, a plurality of flow detectors at least one of which has a flow control valve having a detection section for a flow sensor disposed in a flow channel penetrating an interior portion of the detector body, ends of the flow channel being in communication with input and output openings provided in mounting surfaces parallel to the axis of the flow channel, a flow control valve disposed in the channel; and a plurality of manifold blocks each having an input and an output passage corresponding to said input and output openings, said input passage being in communication with an input common passage, the output passage being individually in communication with an output port;

said manifold blocks respectively being coupled to said flow detectors wherein the input and output openings in the flow detector are respectively joined with the input and the output passages in the manifold block, respectively, and wherein:

said manifold blocks are connected and fixed together such that the input common passages provided therein communicate mutually, the input common passage communicating with a common input port.

2. A flow detector assembly according to claim 1 wherein:

said flow detector comprising said detector body in combination with said flow sensor; and input and output blocks mounted on the input and output sides of the flow channel in the detector body and having mounting surfaces into which said input and output openings are opened that are in communication with the flow channel, and comprising seal members for joining together the channels in said detector body and the input and output blocks, the detector body and each of the input and output blocks being fixedly connected at peripheral positions separate from the channels via connection members, and wherein said flow control valve is provided in said input and/or output blocks.

3. A flow detector assembly according to claim 1 or 2 wherein:

the input and output openings in the flow detector are joined with the input and output passages in each of the manifold blocks to connect each of said manifold blocks and each of said flow detectors together via seal members at positions separate from the input and output passages and input and output openings, using a connection device.

4. A flow detector assembly according to claim 1 or 2 wherein:

a joint member having a common input port in communication with the input common passage in each of said manifold blocks and a joint member having an output port in communication with the output passage in each of said manifold blocks are provided, each said joint member having flange sections that are respectively mounted to the periphery of the openings of said input common passage and output passage via seal members, and wherein the flange sections can be used for fixed connections with at least one of the manifold blocks using connection members.

5. A flow detector assembly according to claim 3 wherein:

a joint member having a common input port in communication with the input common passage in each of said manifold blocks and a joint member having an output port in communication with the output passage in each of said manifold blocks are provided, each of said joint members having flange sections that are respectively mounted to the periphery of the openings of said input common passage and output passage via seal members, and wherein the flange sections can be used for fixed connections with at least one of the manifold blocks using connection members.

* * * * *